US008401845B2

(12) United States Patent
Vaillancourt et al.

(10) Patent No.: US 8,401,845 B2
(45) Date of Patent: Mar. 19, 2013

(54) SYSTEM AND METHOD FOR ENHANCING A DECODED TONAL SOUND SIGNAL

(75) Inventors: Tommy Vaillancourt, Sherbrooke (CA); Milan Jelinek, Sherbrooke (CA); Vladimir Malenovsky, Sherbrooke (CA); Redwan Salami, St-Laurent (CA)

(73) Assignee: VoiceAge Corporation, Québec (CA)

( * ) Notice: Subject to any disclaimer, the term of this patent is extended or adjusted under 35 U.S.C. 154(b) by 347 days.

(21) Appl. No.: 12/918,586

(22) PCT Filed: Mar. 5, 2009

(86) PCT No.: PCT/CA2009/000276
§ 371 (c)(1),
(2), (4) Date: Nov. 8, 2010

(87) PCT Pub. No.: WO2009/109050
PCT Pub. Date: Sep. 11, 2009

(65) Prior Publication Data

US 2011/0046947 A1 Feb. 24, 2011

Related U.S. Application Data

(60) Provisional application No. 61/064,430, filed on Mar. 5, 2008.

(51) Int. Cl.
*G10L 21/02* (2006.01)
*G10L 19/14* (2006.01)
*G10L 19/00* (2006.01)
*H04B 15/00* (2006.01)

(52) U.S. Cl. ........ 704/228; 704/205; 704/219; 704/230; 704/500; 381/94.1

(58) Field of Classification Search ........................ None
See application file for complete search history.

(56) References Cited

U.S. PATENT DOCUMENTS 5,659,661 A 8/1997 Ozawa
5,712,953 A * 1/1998 Langs ........................... 704/214
(Continued)

FOREIGN PATENT DOCUMENTS

CA 2454296 6/2005
EP 0 645 769 3/1995
(Continued)

OTHER PUBLICATIONS

Rapporteur, "Draft New ITU-T Recommendation. G.VBR-EV.", International Communication Unit, ITU-T SG16 Meeting, Geneva, Apr. 2008, 232 sheets.

(Continued)

*Primary Examiner* — Brian Albertalli
(74) *Attorney, Agent, or Firm* — Fay Kaplun & Marcin, LLP

(57) ABSTRACT

A system and method for enhancing a tonal sound signal decoded by a decoder of a speech-specific codec in response to a received coded bit stream, in which a spectral analyser is responsive to the decoded tonal sound signal to produce spectral parameters representative of the decoded tonal sound signal. A quantization noise in low-energy spectral regions of the decoded tonal sound signal is reduced in response to the spectral parameters produced by the spectral analyser. The spectral analyser divides a spectrum resulting from spectral analysis into a set of critical frequency bands each comprising a number of frequency bins, and the reducer of quantization noise comprises a noise attenuator that scales the spectrum of the decoded tonal sound signal per critical frequency band, per frequency bin, or per both critical frequency band and frequency bin.

20 Claims, 6 Drawing Sheets

U.S. PATENT DOCUMENTS

| | | | | |
|---|---|---|---|---|
| 6,138,093 | A | 10/2000 | Ekudden et al. | |
| 6,570,991 | B1 * | 5/2003 | Scheirer et al. | 381/110 |
| 7,058,572 | B1 | 6/2006 | Nemer | |
| 7,328,151 | B2 * | 2/2008 | Muesch | 704/228 |
| 7,454,332 | B2 * | 11/2008 | Koishida et al. | 704/227 |
| 7,848,358 | B2 * | 12/2010 | LaDue | 370/494 |
| 8,175,145 | B2 * | 5/2012 | Garcia et al. | 375/240 |
| 8,175,869 | B2 * | 5/2012 | Sung et al. | 704/218 |
| 2005/0131678 | A1 | 6/2005 | Chandran et al. | |
| 2006/0025993 | A1 * | 2/2006 | Aarts et al. | 704/228 |
| 2006/0116874 | A1 | 6/2006 | Samuelsson et al. | |
| 2006/0271354 | A1 | 11/2006 | Sun et al. | |
| 2011/0153314 | A1 * | 6/2011 | Oxford et al. | 704/200.1 |

FOREIGN PATENT DOCUMENTS

| | | |
|---|---|---|
| JP | 2006-18023 | 1/2006 |
| RU | 2 127 454 | 3/1999 |
| RU | 2 131 169 | 5/1999 |
| WO | 98/39768 | 9/1998 |
| WO | 02/073592 | 9/2002 |

OTHER PUBLICATIONS

3GPP TS 26.190 V6.1.1, 3rd Generation Partnership Project; Technical Specification Group Services and System Aspects; Speech Codec Processing Functions; Adaptive Multi-Rate-Wideband (AMR-WB) Speech Codec; Transcoding Functions (Release 6), Jun. 2005, pp. 1-53.

Johnston, “Transform Coding of Audio Signals Using Perceptual Noise Criteria”, IEEE Journal on Selected Areas in Communications, vol. 6, No. 2, Feb. 1988, pp. 314-323.

* cited by examiner

SYSTEM AND METHOD FOR ENHANCING A DECODED TONAL SOUND SIGNAL

PRIORITY CLAIM

This application is a National Phase Application of the PCT Application Serial No. PCT/CA2009/000276 filed on Mar. 5, 2009 which claims the benefit of U.S. Provisional Patent Application Ser. No. 61/064,430 filed on Mar. 5, 2008, the specifications of both applications are expressly incorporated herein, in their entirety, by reference.

FIELD OF THE INVENTION

The present invention relates to a system and method for enhancing a decoded tonal sound signal, for example an audio signal such as a music signal coded using a speech-specific codec. For that purpose, the system and method reduce a level of quantization noise in regions of the spectrum exhibiting low energy.

BACKGROUND OF THE INVENTION

The demand for efficient digital speech and audio coding techniques with a good trade-off between subjective quality and bit rate is increasing in various application areas such as teleconferencing, multimedia, and wireless communications.

A speech coder converts a speech signal into a digital bit stream which is transmitted over a communication channel or stored in a storage medium. The speech signal is digitized, that is, sampled and quantized with usually 16-bits per sample. The speech coder has the role of representing the digital samples with a smaller number of bits while maintaining a good subjective speech quality. The speech decoder or synthesizer operates on the transmitted or stored bit stream and converts it back to a sound signal.

Code-Excited Linear Prediction (CELP) coding is one of the best prior art techniques for achieving a good compromise between subjective quality and bit rate. The CELP coding technique is a basis of several speech coding standards both in wireless and wireline applications. In CELP coding, the sampled speech signal is processed in successive blocks of L samples usually called frames, where L is a predetermined number of samples corresponding typically to 10-30 ms. A linear prediction (LP) filter is computed and transmitted every frame. The computation of the LP filter typically uses a lookahead, for example a 5-15 ms speech segment from the subsequent frame. The L-sample frame is divided into smaller blocks called subframes. Usually the number of subframes is three (3) or four (4) resulting in 4-10 ms subframes. In each subframe, an excitation signal is usually obtained from two components, a past excitation and an innovative, fixed-codebook excitation. The component formed from the past excitation is often referred to as the adaptive-codebook or pitch-codebook excitation. The parameters characterizing the excitation signal are coded and transmitted to the decoder, where the excitation signal is reconstructed and used as the input of the LP filter.

In some applications, such as music-on-hold, low bit rate speech-specific codecs are used to operate on music signals. This usually results in bad music quality due to the use of a speech production model in a low bit rate speech-specific codec.

In some music signals, the spectrum exhibits a tonal structure wherein several tones are present (corresponding to spectral peaks) and are not harmonically related. These music signals are difficult to encode with a low bit rate speech-specific codec using an all-pole synthesis filter and a pitch filter. The pitch filter is capable of modeling voice segments in which the spectrum exhibits a harmonic structure comprising a fundamental frequency and harmonics of this fundamental frequency. However, such a pitch filter fails to properly model tones which are not harmonically related. Furthermore, the all-pole synthesis filter fails to model the spectral valleys between the tones. Thus, when a low bit rate speech-specific codec using a speech production model such as CELP is used, music signals exhibit an audible quantization noise in the low-energy regions of the spectrum (inter-tone regions or spectral valleys).

SUMMARY OF THE INVENTION

An objective of the present invention is to enhance a tonal sound signal decoded by a decoder of a speech-specific codec in response to a received coded bit stream, for example an audio signal such as a music signal, by reducing quantization noise in low-energy regions of the spectrum (inter-tone regions or spectral valleys).

More specifically, according to the present invention, there is provided a system for enhancing a tonal sound signal decoded by a decoder of a speech-specific codec in response to a received coded bit stream, comprising: a spectral analyser responsive to the decoded tonal sound signal to produce spectral parameters representative of the decoded tonal sound signal; and a reducer of a quantization noise in low-energy spectral regions of the decoded tonal sound signal in response to the spectral parameters from the spectral analyser.

The present invention also relates to a method for enhancing a tonal sound signal decoded by a decoder of a speech-specific codec in response to a received coded bit stream, comprising: spectrally analysing the decoded tonal sound signal to produce spectral parameters representative of the decoded tonal sound signal; and reducing a quantization noise in low-energy spectral regions of the decoded tonal sound signal in response to the spectral parameters from the spectral analysis.

The present invention further relates to a system for enhancing a decoded tonal sound signal, comprising: a spectral analyser responsive to the decoded tonal sound signal to produce spectral parameters representative of the decoded tonal sound signal, wherein the spectral analyser divides a spectrum resulting from spectral analysis into a set of critical frequency bands, and wherein each critical frequency band comprises a number of frequency bins; and a reducer of a quantization noise in low-energy spectral regions of the decoded tonal sound signal in response to the spectral parameters from the spectral analyser, wherein the reducer of quantization noise comprises a noise attenuator that scales the spectrum of the decoded tonal sound signal per critical frequency band, per frequency bin, or per both critical frequency band and frequency bin.

The present invention still further relates to a method for enhancing a decoded tonal sound signal, comprising: spectrally analysing the decoded tonal sound signal to produce spectral parameters representative of the decoded tonal sound signal, wherein spectrally analysing the decoded tonal sound signal comprises dividing a spectrum resulting from the spectral analysis into a set of critical frequency bands each comprising a number of frequency bins; and reducing a quantization noise in low-energy spectral regions of the decoded tonal sound signal in response to the spectral parameters from the spectral analysis, wherein reducing the quantization noise comprises scaling the spectrum of the decoded tonal sound signal per critical frequency band, per frequency bin, or per both critical frequency band and frequency bin.

The foregoing and other objects, advantages and features of the present invention will become more apparent upon reading of the following non restrictive description of illustrative embodiments thereof, given by way of example only with reference to the accompanying drawings.

DETAILED DESCRIPTION

In the following detailed description, an inter-tone noise reduction technique is performed within a low bit rate speech-specific codec to reduce a level of inter-tone quantization noise for example in musical content. The inter-tone noise reduction technique can be deployed with either narrowband sound signals sampled at 8000 samples/s or wideband sound signals sampled at 16000 samples/s or at any other sampling frequency. The inter-tone noise reduction technique is applied to a decoded tonal sound signal to reduce the quantization noise in the spectral valleys (low energy regions between tones). In some music signals, the spectrum exhibits a tonal structure wherein several tones are present (corresponding to spectral peaks) and are not harmonically related. These music signals are difficult to encode with a low bit rate speech-specific codec which uses an all-pole LP synthesis filter and a pitch filter. The pitch filter can model voiced speech segments having a spectrum that exhibits a harmonic structure with a fundamental frequency and harmonics of that fundamental frequency. However, the pitch filter fails to properly model tones which are not harmonically related. Further, the all-pole LP synthesis filter fails to model the spectral valleys between the tones. Thus, using a low bit rate speech-specific codec with a speech production model such as CELP, the modeled signals will exhibit an audible quantization noise in the low-energy regions of the spectrum (inter-tone regions or spectral valleys). The inter-tone noise reduction technique is therefore concerned with reducing the quantization noise in low-energy spectral regions to enhance a decoded tonal sound signal, more specifically to enhance quality of the decoded tonal sound signal.

In one embodiment, the low bit rate speech-specific codec is based on a CELP speech production model operating on either narrowband or wideband signals (8 or 16 kHz sampling frequency). Any other sampling frequency could also be used.

Figure 6:
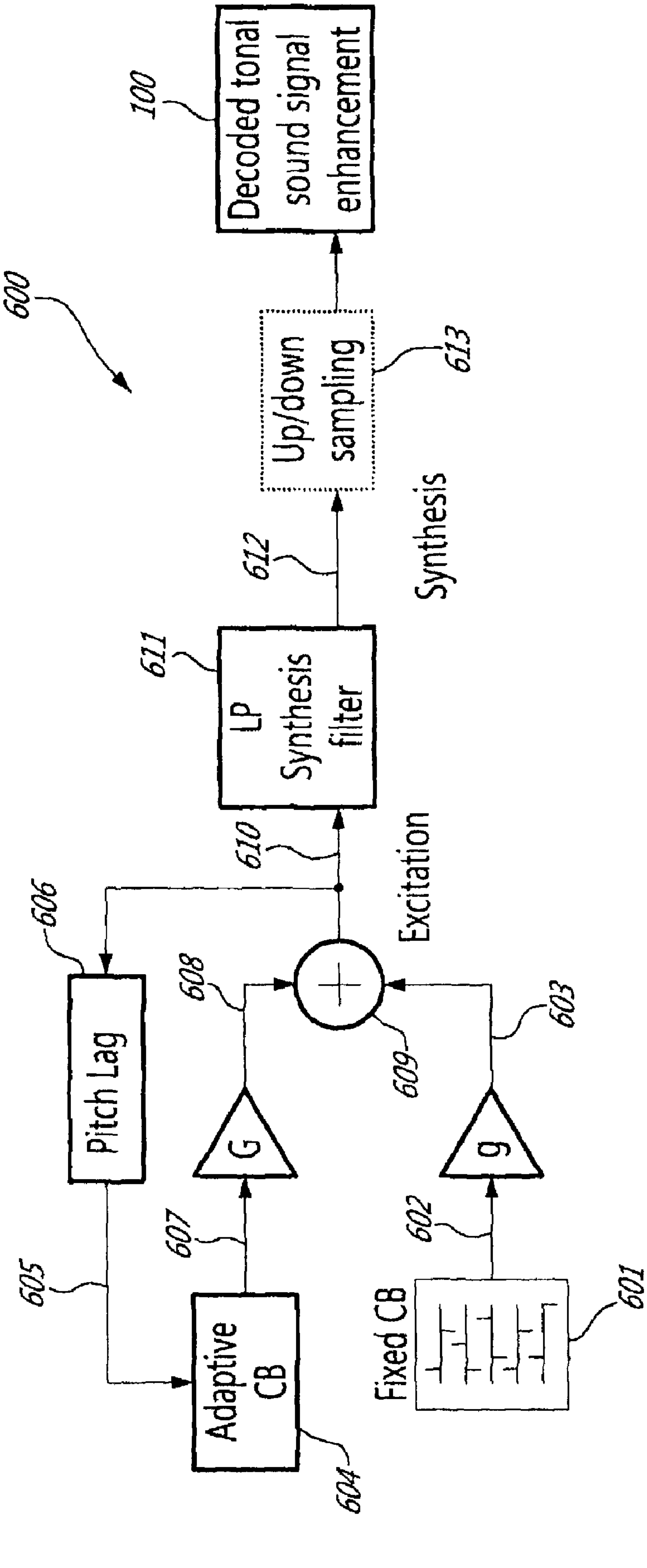
FIG. 6 is a schematic block diagram of a decoder of a low bit rate speech-specific codec using a speech production model comprising a LP synthesis filter modeling the vocal tract shape (spectral envelope) and a pith filter modeling the vocal chords (harmonic fine structure).

An example 600 of the decoder of a low bit rate speech-specific codec using a CELP speech production model will be briefly described with reference to FIG. 6. In response to a fixed codebook index extracted from the received coded bit stream, a fixed codebook 601 produces a fixed-codebook vector 602 multiplied by a fixed-codebook gain g to produce an innovative, fixed-codebook excitation 603. In a similar manner, an adaptive codebook 604 is responsive to a pitch delay extracted from the received coded bit stream to produce an adaptive-codebook vector 607; the adaptive codebook 604 is also supplied (see 605) with the excitation signal 610 through a feedback loop comprising a pitch filter 606. The adaptive-codebook vector 607 is multiplied by a gain G to produce an adaptive-codebook excitation 608. The innovative, fixed-codebook excitation 603 and the adaptive-codebook excitation 608 are summed through an adder 609 to form the excitation signal 610 supplied to an LP synthesis filter 611; the LP synthesis filter 611 is controlled by LP filter parameters extracted from the received coded bit stream. The LP synthesis filter 611 produces a synthesis sound signal 612, or decoded tonal sound signal that can be upsampled/downsampled in module 613 before being enhanced using the system 100 and method for enhancing a decoded tonal sound signal.

For example, a codec based on the AMR-WB ([1]—3GPP TS 26.190, "Adaptive Multi-Rate-Wideband (AMR-WB) speech codec; Transcoding functions") structure can be used. The AMR-WB speech codec uses an internal sampling frequency of 12.8 kHz, and the signal can be re-sampled to either 8 or 16 kHz before performing reduction of the inter-tone quantization noise or, alternatively, noise reduction or audio enhancement can be performed at 12.8 kHz.

Figure 1:
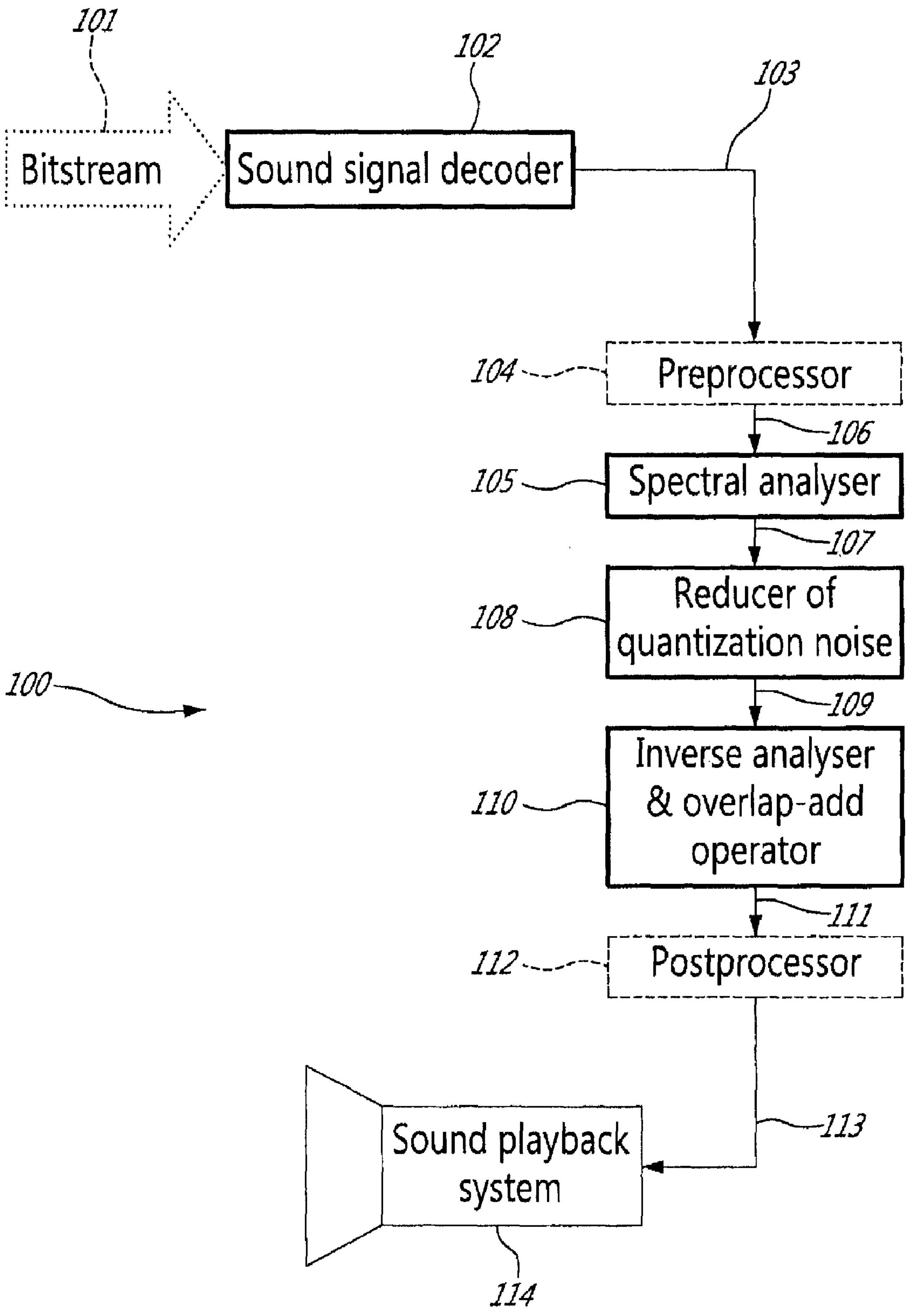
FIG. 1 is a schematic block diagram showing an overview of a system and method for enhancing a decoded tonal sound signal.

FIG. 1 is a schematic block diagram showing an overview of a system and method 100 for enhancing a decoded tonal sound signal.

Referring to FIG. 1, a coded bit stream 101 (coded sound signal) is received and processed through a decoder 102 (for example the decoder 600 of FIG. 6) of a low bit rate speech-specific codec to produce a decoded sound signal 103. As indicated in the foregoing description, the decoder 102 can be, for example, a speech-specific decoder using a CELP speech production model such as an AMR-WB decoder.

The decoded sound signal 103 at the output of the sound signal decoder 102 is converted (re-sampled) to a sampling frequency of 8 kHz. However, it should be kept in mind that the inter-tone noise reduction technique disclosed herein can be equally applied to decoded tonal sound signals at other sampling frequencies such as 12.8 kHz or 16 kHz.

Preprocessing can be applied or not to the decoded sound signal 103. When preprocessing is applied, the decoded sound signal 103 is, for example, pre-emphasized through a preprocessor 104 before spectral analysis in the spectral analyser 105 is performed.

To pre-emphasize the decoded sound signal 103, the preprocessor 104 comprises a first order high-pass filter (not shown). The first order high-pass filter emphasizes higher frequencies of the decoded sound signal 103 and may have, for that purpose, the following transfer function:

$$H_{pre\text{-}emph}(z)=1-0.68z^{-1} \quad (1)$$

where z represents the Z-transform variable.

Pre-emphasis of the higher frequencies of the decoded sound signal 103 has the property of flattening the spectrum of the decoded sound signal 103, which is useful for inter-tone noise reduction.

Following the pre-emphasis of the higher frequencies of the decoded sound signal 103 in the preprocessor 104:

Spectral analysis of the pre-emphasized decoded sound signal 106 is performed in the spectral analyser 105.

This spectral analysis uses Discrete Fourier Transform (DFT) and will be described in more detail in the following description.

The inter-tone noise reduction technique is applied in response to the spectral parameters 107 from the spectral analyser 107 and is implemented in a reducer 108 of quantization noise in the low-energy spectral regions of the decoded tonal sound signal. The operation of the reducer 108 of quantization noise will be described in more detail in the following description.

An inverse analyser and overlap-add operator 110 (a) applies an inverse DFT (Discrete Fourier Transform) to the inter-tone noise reduced spectral parameters 109 to convert those parameters 109 back to the time domain, and (b) uses an overlap-add operation to reconstruct the enhanced decoded tonal sound signal 111. The operation of the inverse analyser and overlap-add operator 110 will be described in more detail in the following description.

A postprocessor 112 post-processes the reconstructed enhanced decoded tonal sound signal 111 from the inverse analyser and overlap-add operator 110. This post-processing is the inverse of the preprocessing stage (preprocessor 104) and, therefore, may consist of de-emphasis of the higher frequencies of the enhanced decoded tonal sound signal. Such de-emphasis will be described in more detail in the following description.

Finally, a sound playback system 114 may be provided to convert the post-processed enhanced decoded tonal sound signal 113 from the postprocessor 112 into an audible sound.

For example, the speech-specific codec in which the inter-tone noise reduction technique is implemented operates on 20 ms frames containing 160 samples at a sampling frequency of 8 kHz. Also according to this example, the sound signal decoder 102 uses a 10 ms lookahead from the future frame for best frame erasure concealment performance. This lookahead is also used in the inter-tone noise reduction technique for a better frequency resolution. The inter-tone noise reduction technique implemented in the reduced 108 of quantization noise follows the same framing structure as in the decoder 102. However, some shift can be introduced between the decoder framing structure and the inter-tone noise reduction framing structure to maximize the use of the lookahead. In the following description, the indices attributed to samples will reflect the inter-tone noise reduction framing structure.

Spectral Analysis

Figure 2:
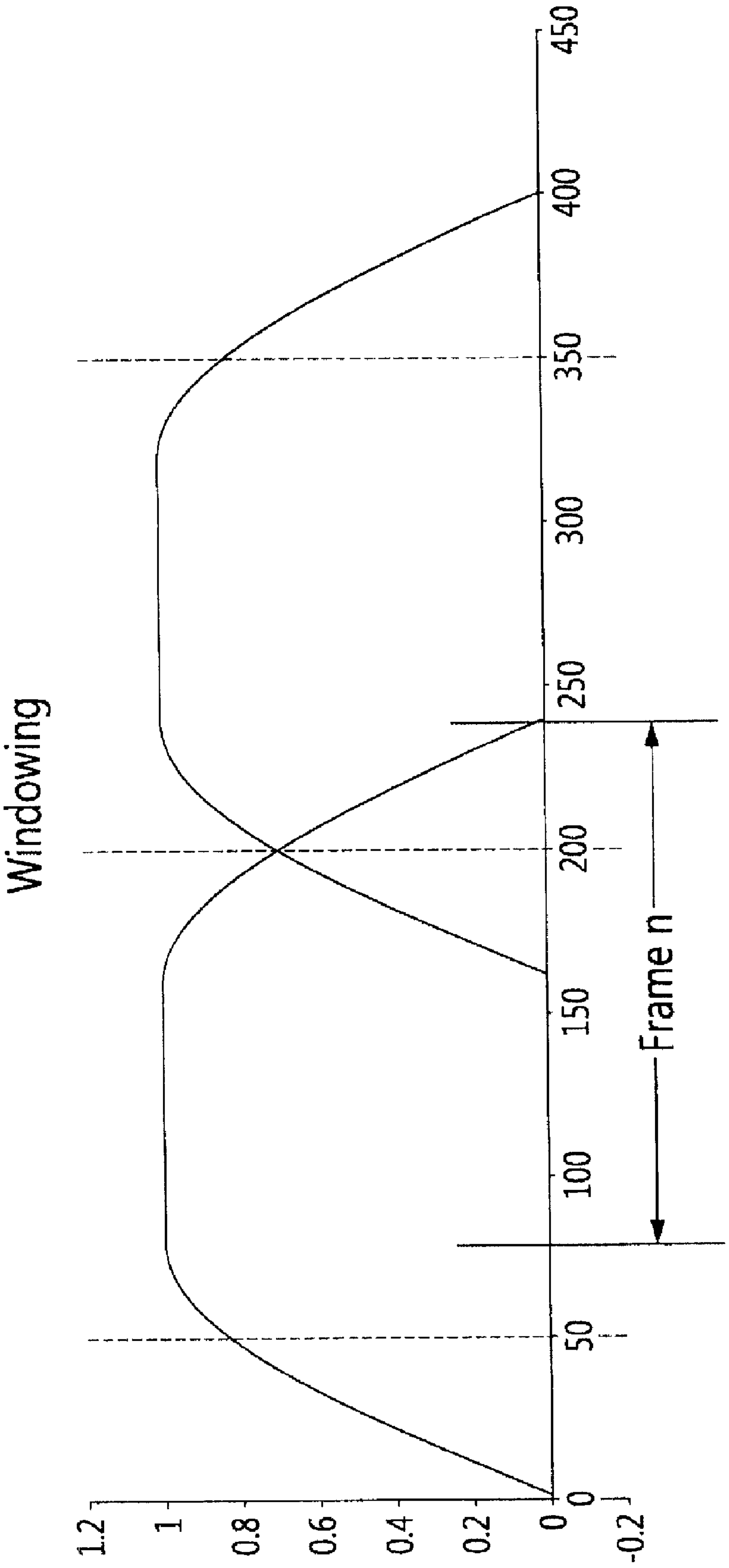
FIG. 2 is a graph illustrating windowing in spectral analysis.
Figure 3:
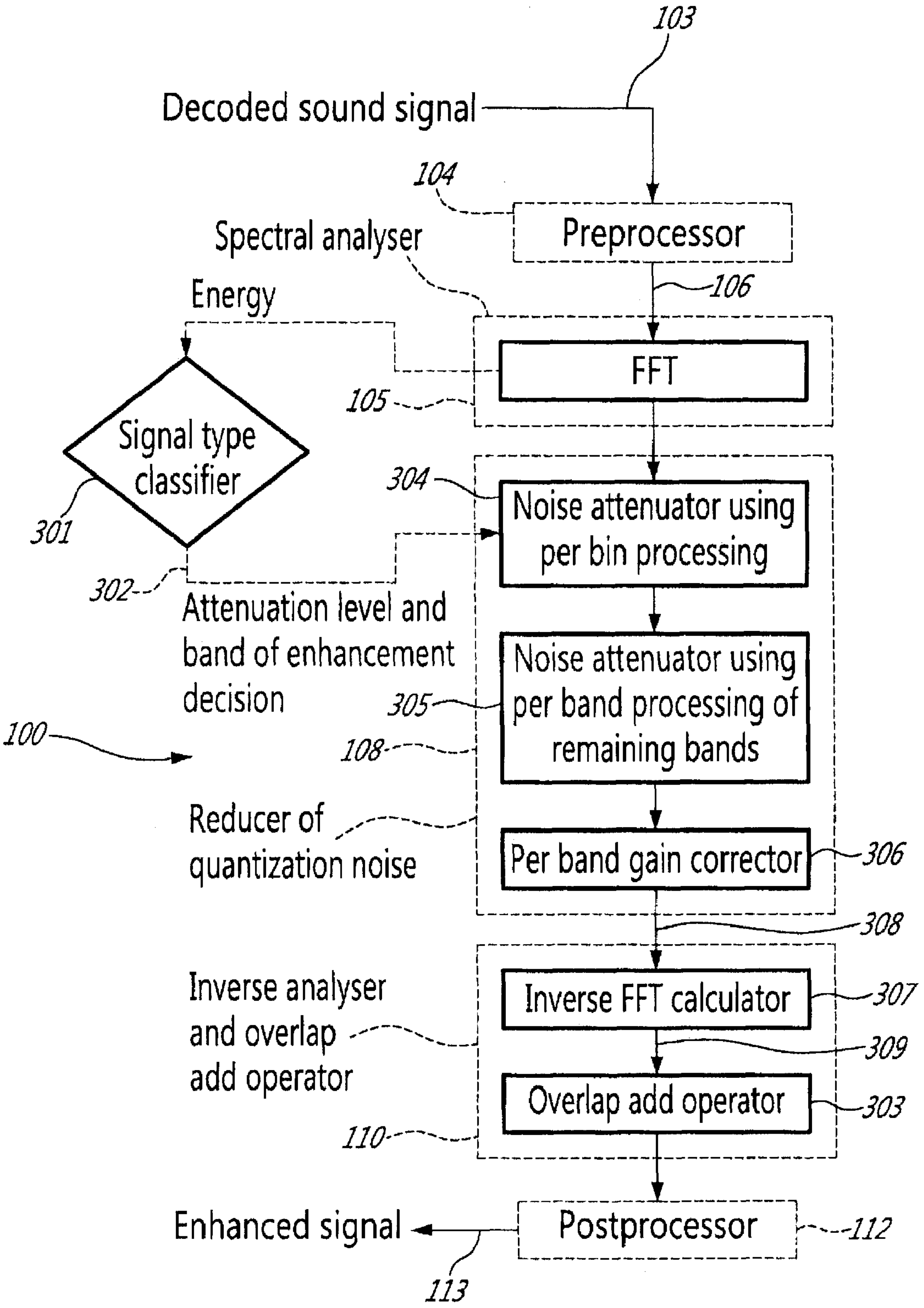
FIG. 3 is a schematic block diagram showing an overview of a system and method for enhancing a decoded tonal sound signal.

Referring to FIG. 3, DFT (Discrete Fourier Transform) is used in the spectral analyser 105 to perform a spectral analysis and spectrum energy estimation of the pre-emphasized decoded tonal sound signal 106. In the spectral analyser 105, spectral analysis is performed in each frame using 30 ms analysis windows with 33% overlap. More specifically, the spectral analysis in the analyser 105 (FIG. 3) is conducted once per frame using a 256-point Fast Fourier Transform (FFT) with the 33.3 percent overlap windowing as illustrated in FIG. 2. The analysis windows are placed so as to exploit the entire lookahead. The beginning of the first analysis window is shifted 80 samples after the beginning of the current frame of the sound signal decoder 102.

The analysis windows are used to weight the pre-emphasized, decoded tonal sound signal 106 for frequency analysis. The analysis windows are flat in the middle with sine function on the edges (FIG. 2) which is well suited for overlap-add operations. More specifically, the analysis window can be described as follow:

$$w_{FFT}(n)=\begin{cases}\sin\left(\frac{\pi n}{2L_{window}/3}\right), & n=0,\ \dots\ ,L_{window}/3-1\\ 1, & n=L_{window}/3,\ \dots\ ,2L_{window}/3-1\\ \sin\left(\frac{\pi(n-L_{window}/3)}{2L_{window}/3}\right), & n=2L_{window}/3,\ \dots\ ,L_{window}-1\end{cases}$$

where $L_{Window}$=240 samples is the size of the analysis window. Since a 256-point FTT ($L_{FFT}$=256) is used, the windowed signal is padded with 16 zero samples.

An alternative analysis window could be used in the case of a wideband signal with only a small lookahead available. This analysis window could have the following shape:

$$w_{FFT_{WB}}(n)=\begin{cases}\sin\left(\frac{\pi n}{2\cdot\frac{L_{window_{WB}}}{9}}\right), & n=0,\ \dots\ ,\frac{L_{window_{WB}}}{9}-1\\ 1, & n=\frac{L_{window_{WB}}}{9},\ \dots\ ,8\cdot\frac{L_{window_{WB}}}{9}-1\\ \sin\left(\frac{\pi\left(n-\frac{L_{window_{WB}}}{9}\right)}{2\cdot\frac{L_{window_{WB}}}{9}}\right), & n=8\cdot\frac{L_{window_{WB}}}{9},\ \dots\ ,L_{window_{WB}}-1\end{cases}$$

where $L_{window_{WB}}$=360 is the size of the wideband analysis window. In that case, a 512-point FFT is used. Therefore, the windowed signal is padded with 152 zero samples. Other radix FFT can potentially be used to reduce as much as possible the zero padding and reduce the complexity.

Let s'(n) denote the decoded tonal sound signal with index 0 corresponding to the first sample in the inter-tone noise reduction frame (As indicated hereinabove, in this embodiment, this corresponds to 80 samples following the beginning of the sound signal decoder frame). The windowed decoded tonal sound signal for the spectral analysis can be obtained using the following relation:

$$x_w^{(1)}(n)=\begin{cases}w_{FFT}(n)s'(n), & n=0,\ \dots\ ,L_{window}-1\\ 0, & n=L_{window},\ \dots\ ,L_{FFT}-1\end{cases}\qquad(2)$$

where s'(0) is the first sample in the current inter-tone noise reduction frame.

FFT is performed on the windowed, decoded tonal sound signal to obtain one set of spectral parameters per frame:

$$X^{(1)}(k)=\sum_{n=0}^{N-1}x_w^{(1)}(n)e^{-j2\pi\frac{kn}{N}},\ k=0,\ \dots\ ,L_{FFT}-1\qquad(3)$$

where $N=L_{FFT}$.

The output of the FFT gives real and imaginary parts of the spectrum denoted by $X_R(k)$, k=0 to $$\frac{L_{FFT}}{2},$$

and $X_I(k)$, k=1 to $$\left(\frac{L_{FFT}}{2}-1\right).$$

Note that $X_R(0)$ corresponds to the spectrum at 0 Hz (DC) and $$X_R\left(\frac{L_{FFT}}{2}\right)$$

corresponds to the spectrum at $$\frac{F_S}{2}$$

Hz, where $F_S$ corresponds to the sampling frequency. The spectrum at these two (2) points is only real valued and usually ignored in the subsequent analysis.

After the FFT analysis, the resulting spectrum is divided into critical frequency bands using the intervals having the following upper limits; (17 critical bands in the frequency range 0-4000 Hz and 21 critical frequency bands in the frequency range 0-8000 Hz) (See [2]: J. D. Johnston, "Transform coding of audio signal using perceptual noise criteria," *IEEE J. Select. Areas Commun.*, vol. 6, pp. 314-323, February 1988).

In the case of narrowband coding, the critical frequency bands={100.0, 200.0, 300.0, 400.0, 510.0, 630.0, 770.0, 920.0, 1080.0, 1270.0, 1480.0, 1720.0, 2000.0, 2320.0, 2700.0, 3150.0, 3700.0, 3950.0} Hz.

In the case of wideband coding, the critical frequency bands={100.0, 200.0, 300.0, 400.0, 510.0, 630.0, 770.0, 920.0, 1080.0, 1270.0, 1480.0, 1720.0, 2000.0, 2320.0, 2700.0, 3150.0, 3700.0, 4400.0, 5300.0, 6700.0, 8000.0} Hz.

The 256-point or 512-point FFT results in a frequency resolution of 31.25 Hz (4000/128=8000/256). After ignoring the DC component of the spectrum, the number of frequency bins per critical frequency band in the case of narrowband coding is $M_{CB}$={3, 3, 3, 3, 3, 4, 5, 4, 5, 6, 7, 7, 9, 10, 12, 14, 17, 12}, respectively, when the resolution is approximated to 32 Hz. In the case of wideband coding $M_{CB}$={3, 3, 3, 3, 3, 4, 5, 4, 5, 6, 7, 7, 9, 10, 12, 14, 17, 22, 28, 44, 41}.

The average spectral energy per critical frequency band is computed as follows:

$$E_{CB}(i)=\frac{1}{(L_{FFT}/2)^2 M_{CB}(i)}\sum_{k=0}^{M_{CB}(i)-1}(X_R^2(k+j_i)+X_I^2(k+j_i)), \tag{4}$$

$$i=0,\ldots,17,$$

where $X_R(k)$ and $X_I(k)$ are, respectively, the real and imaginary parts of the $k^{th}$ frequency bin and $j_i$ is the index of the first bin in the $i^{th}$ critical band given by $j_i$={1, 4, 7, 10, 13, 16, 20, 25, 29, 34, 40, 47, 54, 63, 73, 85, 99, 116} in the case of narrowband coding and $j_i$={1, 4, 7, 10, 13, 16, 20, 25, 29, 34, 40, 47, 54, 63, 73, 85, 99, 116, 138, 166, 210} in the case of wideband coding.

The spectral analyser 105 of FIG. 3 also computes the energy of the spectrum per frequency bin, $E_{BIN}(k)$, for the first 17 critical bands (115 bins excluding the DC component) using the following relation:

$$E_{BIN}(k)=X_R^2(k)+X_I^2(k),\ k=0,\ldots,114 \tag{5}$$

Finally, the spectral analyser 105 computes a total frame spectral energy as an average of the spectral energies of the first 17 critical frequency bands calculated by the spectral analyser 105 in a frame using, the following relation:

$$E_{fr}^t=10\log\left(\sum_{i=0}^{i=16}\bar{E}_{CB}(i)\right),\ \text{dB} \tag{6}$$

The spectral parameters 107 from the spectral analyser 105 of FIG. 3, more specifically the above calculated average spectral energy per critical band, spectral energy per frequency bin, and total frame spectral energy are used in the reducer 108 to reduce quantization noise and perform gain correction.

It should be noted that, for a wideband decoded tonal sound signal sampled at 16000 samples/s, up to 21 critical frequency bands could be used but computation of the total frame energy $E_{fr}^t$ at time t will still be performed on the first 17 critical bands.

Signal Type Classifier:

The inter-tone noise reduction technique conducted by the system and method 100 enhances a decoded tonal sound signal, such as a music signal, coded by means of a speech-specific codec. Usually, non-tonal sounds such as speech are well coded by a speech-specific codec and do not need this type of frequency based enhancement.

The system and method 100 for enhancing a decoded tonal sound signal further comprises, as illustrated in FIG. 3, a signal type classifier 301 designed to further maximize the efficiency of the reducer 108 of quantization noise by identifying which sound is well suited for inter-tone noise reduction, like music, and which sound is not, like speech.

The signal type classifier 301 comprises the feature of not only separating the decoded sound signal into sound signal categories, but also to give instruction to the reducer 108 of quantization noise to reduce at a minimum any possible degradation of speech.

Figure 5:
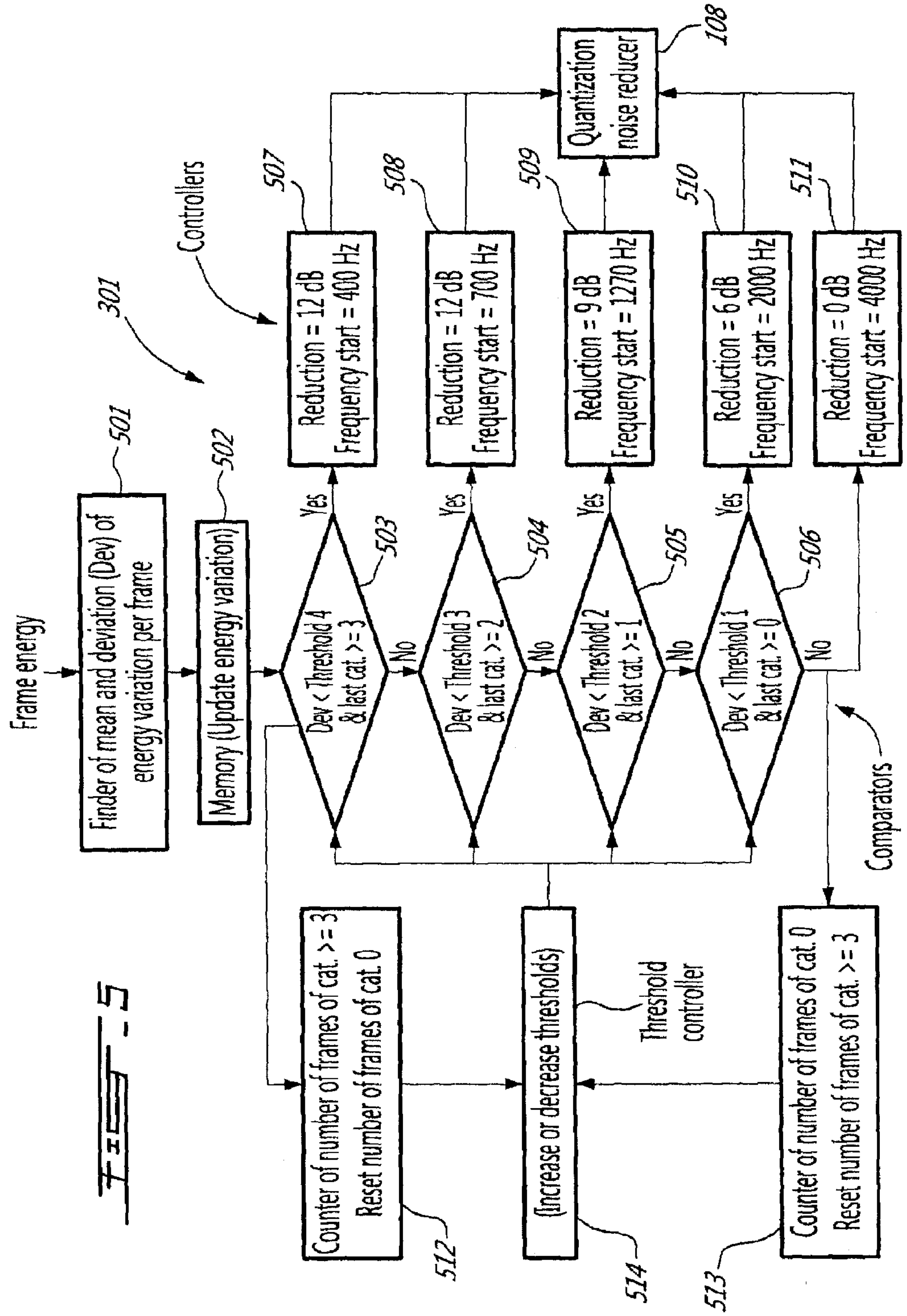
FIG. 5 is a schematic block diagram of an example of signal type classifier.

A schematic block diagram of the signal type classifier 301 is illustrated in FIG. 5. In the presented embodiment, the signal type classifier 301 has been kept as simple as possible. The principal input to the signal type classifier 301 is the total frame spectral energy $E_t$ as formulated in Equation (6).

First, the signal type classifier 301 comprises a finder 501 that determines a mean of the past forty (40) total frame spectral energy ($E_t$) variations calculated using the following relation:

$$\bar{E}_{diff}=\frac{\left(\sum_{t=-40}^{t=-1}\Delta_E^t\right)}{40},\ \text{where } \Delta_E^t=E_{fr}^t-E_{fr}^{(t-1)} \tag{7}$$

Then, the finder 501 determines a statistical deviation of the energy variation history $\sigma_E$ over the last fifteen (15) frames using the following relation:

$$\sigma_E=0.7745967\cdot\sqrt{\sum_{t=-15}^{t=-1}\frac{(\Delta_E^t-\bar{E}_{diff})^2}{15}} \tag{8}$$

The signal type classifier 301 comprises a memory 502 updated with the mean and deviation of the variation of the total frame spectral energy $E_t$ as calculated in Equations (7) and (8).

The resulting deviation $\sigma_E$ is compared to four (4) floating thresholds in comparators 503-506 to determine the efficiency of the reducer 108 of quantization noise on the current decoded sound signal. In the example of FIG. 5, the output 302 (FIG. 3) of the signal type classifier 301 is split into five (5) sound signal categories, named sound signal categories 0 to 4, each sound signal category having its own inter-tone noise reduction tuning.

The five (5) sound signal categories 0-4 can be determined as indicated in the following Table:

| Category | Enhanced band (narrowband) Hz | Enhanced band (wideband) Hz | Allowed reduction dB |
|---|---|---|---|
| 0 | NA | NA | 0 |
| 1 | [2000, 4000] | [2000, 8000] | 6 |
| 2 | [1270, 4000] | [1270, 8000] | 9 |
| 3 | [700, 4000] | [700, 8000] | 12 |
| 4 | [400, 4000] | [400, 8000] | 12 |

The sound signal category 0 is a non-tonal sound signal category, like speech, which is not modified by the inter-tone noise reduction technique. This category of decoded sound signal has a large statistical deviation of the spectral energy variation history. When detection of categories 1-4 by the comparators 503-506 is negative, a controller 511 instructs the reducer 108 of quantization noise not to reduce inter-tone quantization noise (Reduction=0 dB).

The tree in between sound signal categories includes sound signals with different types of statistical deviation of spectral energy variation history.

Sound signal category 1 (biggest variation after "speech type" decoded sound signal) is detected by the comparator 506 when the statistical deviation of spectral energy variation history is lower than a Threshold 1. A controller 510 is responsive to such a detection by the comparator 506 to instruct, when the last detected sound signal category was ≧0, the reducer 108 of quantization noise to enhance the decoded tonal sound signal within the frequency band 2000 to $$\frac{F_S}{2}$$

Hz by reducing the inter-tone quantization noise by a maximum allowed amplitude of 6 dB.

Sound signal category 2 is detected by the comparator 505 when the statistical deviation of spectral energy variation history is lower than a Threshold 2. A controller 509 is responsive to such a detection by the comparator 505 to instruct, when the last detected sound signal category was ≧1, the reducer 108 of quantization noise to enhance the decoded tonal sound signal within the frequency band 1270 to $$\frac{F_S}{2}$$

Hz by reducing the inter-tone quantization noise by a maximum allowed amplitude of 9 dB.

Sound signal category 3 is detected by the comparator 504 when the statistical deviation of spectral energy variation history is lower than a Threshold 3. A controller 508 is responsive to such a detection by the comparator 504 to instruct, when the last detected sound signal category was ≧2, the reducer 108 of quantization noise to enhance the decoded tonal sound signal within the frequency band 700 to $$\frac{F_S}{2}$$

Hz by reducing the inter-tone quantization noise by a maximum allowed amplitude of 12 dB.

Sound signal category 4 is detected by the comparator 503 when the statistical deviation of spectral energy variation history is lower than a Threshold 4. A controller 507 is responsive to such a detection by the comparator 503 to instruct, when the last detected signal type category was ≧3, the reducer 108 of quantization noise to enhance the decoded tonal sound signal within the frequency band 400 to $$\frac{F_S}{2}$$

Hz by reducing the inter-tone quantization noise by a maximum allowed amplitude of 12 dB.

In the embodiment of FIG. 5, the signal type classifier 301 uses floating thresholds 1-4 to split the decoded sound signal into the different categories 0-4. These floating thresholds 1-4 are particularly useful to prevent wrong signal type classification. Typically, decoded tonal sound signal like music gets much lower statistical deviation of its spectral energy variation than non-tonal sound signal like speech. But music could contain higher statistical deviation and speech could contain lower statistical deviation. It is unlikely that speech or music content changes from one to another on a frame basis. The floating thresholds acts like reinforcement to prevent any misclassification that could result in a suboptimal performance of the reducer 108 of quantization noise.

Counters of a series of frames of sound signal category 0 and of a series of frames of sound signal category 3 or 4 are used to respectively decrease or increase thresholds.

For example, if a counter 512 counts a series of more than 30 frames of sound signal category 3 or 4, the floating thresholds 1-4 will be increased by a threshold controller 514 for the purpose of allowing more frames to be considered as sound signal category 4. Each time the count of the counter 512 is incremented, the counter 513 is reset to zero.

The inverse is also true with sound signal category 0. For example, if a counter 513 counts a series of more than 30 frames of sound signal category 0, the threshold controller 514 decreases the floating thresholds 1-4 for the purpose of allowing more frames to be considered as sound signal category 0. The floating thresholds 1-4 are limited to absolute maximum and minimum values to ensure that the signal type classifier 301 is not locked to a fixed category.

The increase and decrease of the thresholds 1-4 can be illustrated by the following relations:

IF (Nbr_cat4_frame>30)

$$\text{Thres}(i)=\text{Thres}(i)+\text{TH\_UP}|_{i=1}^{4}$$

ELSE IF (Nbr_cat0_frame>30)

$$\text{Thres}(i)=\text{Thres}(i)-\text{TH\_DWN}|_{i=1}^{4}$$

$$\text{Thres}(i)=\text{MIN}(\text{Thres}(i),\text{MAX\_TH})|_{i=1}^{4}$$

$$\text{Thres}(i)=\text{MAX}(\text{Thres}(i),\text{MIN\_TH})|_{i=1}^{4}$$

In the case of frame erasure, all the thresholds 1-4 are reset to theirs minimum values and the output of the signal type classifier 301 is considered as non-tonal (sound signal category 0) for three (3) frames including the lost frame.

If information from a Voice Activity Detector (VAD) (not shown) is available and is indicating no voice activity (presence of silence), the decision of the signal type classifier 301 is forced to sound signal category 0.

According to an alternative of the signal type classifier 301, the frequency band of allowed enhancement and/or the level of maximum inter-tone noise reduction could be completely dynamic (without hard step).

In the case of a small lookahead, it could be necessary to introduce a minimum gain reduction smoothing in the first critical bands to further reduce any potential distortion introduced with the inter-tone noise reduction. This smoothing could be performed using the following relation:

$$RedGain_i = 1.0\,|_{i=[0,FEhBand]};$$

$$RedGain_i = RedGain_{i-1} - \left(\frac{(1.0-\text{Allow\_red})}{(10-FEhBand)}\right)_{i=]FEhBand,10]};$$

$$RedGain_i = \text{Allow\_red}\,|_{i=]10,max\_band]}$$

where $\text{RedGain}_i$ is a maximum gain reduction per band, FEhBand is the first band where the inter-tone noise reduction is allowed (vary typically between 400 Hz and 2 kHz or critical frequency bands 3 and 12), Allow_red is the level of noise reduction allowed per sound signal category presented in the previous table and max_band is the maximum band for the inter tone noise reduction (17 for Narrowband (NB) and 20 for Wideband (WB)).

Inter-Tone Noise Reduction:

Inter-tone noise reduction is applied (see reducer 108 of quantization noise (FIG. 3)) and the enhanced decoded sound signal is reconstructed using an overlap and add operation (see overlap add operator 303 (FIG. 3)). The reduction of inter-tone quantization noise is performed by scaling the spectrum in each critical frequency band with a scaling gain limited between $g_{min}$ and 1 and derived from the signal-to-noise ratio (SNR) in that critical frequency band. A feature of the inter-tone noise reduction technique is that for frequencies lower than a certain frequency, for example related to signal voicing, the processing is performed on a frequency bin basis and not on critical frequency band basis. Thus, a scaling gain is applied on every frequency bin derived from the SNR in that bin (the SNR is computed using the bin energy divided by the noise energy of the critical band including that bin). This feature has the effect of preserving the energy at frequencies near harmonics or tones preventing distortion while strongly reducing the quantization noise between the harmonics. In the case of narrow band signals, per bin analysis can be used for the whole spectrum. Per bin analysis can alternatively be used in all critical frequency bands except the last one.

Referring to FIG. 3, inter-tone quantization noise reduction is performed in the reducer 108 of quantization noise. According to a first possible implementation, per bin processing can be performed over all the 115 frequency bins in narrowband coding (250 frequency bins in wideband coding) in a noise attenuator 304.

In an alternative implementation, noise attenuator 304 perform per bin processing to apply a scaling gain to each frequency bin in the first voiced K bands and then noise attenuator 305 performs per band processing to scale the spectrum in each of the remaining critical frequency bands with a scaling gain. If K=0 then the noise attenuator 305 performs per band processing in all the critical frequency bands.

The minimum scaling gain $g_{min}$ is derived from the maximum allowed inter-tone noise reduction in dB, $NR_{max}$. As described in the foregoing description (see the table above), the signal type classifier 301 makes the maximum allowed noise reduction $NR_{max}$ varying between 6 and 12 dB. Thus minimum scaling gain is given by the relation:

$$g_{min}=10^{-NR_{max}/20} \tag{9}$$

In the case of a narrowband tonal frame, the scaling gain can be computed in relation to the SNR per frequency bin then per bin noise reduction is performed. Per bin processing is applied only to the first 17 critical bands corresponding to a maximum frequency of 3700 Hz. The maximum number of frequency bins in which per bin processing can be used is 115 (the number of bins in the first 17 bands at 4 kHz).

In the case of a wideband tonal frame, per bin processing is applied to all the 21 critical frequency bands corresponding to a maximum frequency of 8000 Hz. The maximum number of frequency bins for which per bin processing can be used is 250 (the number of bins in the first 21 bands at 8 kHz).

In the inter-tone noise reduction technique, noise reduction starts at the fourth critical frequency band (no reduction performed before 400 Hz). To reduce any negative impact of the inter-tone quantization noise reduction technique, the signal type classifier 301 could push the starting critical frequency band up to the $12^{th}$. This means that the first critical frequency band on which inter-tone noise reduction is performed is somewhere between 400 Hz and 2 kHz and could vary on a frame basis.

The scaling gain for a certain critical frequency band, or for a certain frequency bin, can be computed as a function of the SNR in that frequency band or bin using the following relation:

$$(g_s)^2=k_s\,\text{SNR}+c_s,\ \text{bounded by } g_{min}\leq g_s\leq 1 \tag{10}$$

The values of $k_s$ and $c_s$ are determined such that $g_s=g_{min}$ for SNR=1 dB, and $g_s=1$ for SNR=45 dB. That is, for SNRs at 1 dB and lower, the scaling gain is limited to $g_s$ and for SNRs at 45 dB and higher, no inter-tone noise reduction is performed in the given critical frequency band ($g_s=1$). Thus, given these two end points, the values of $k_s$ and $c_s$ in Equation (10) can be calculated using the following relations:

$$k_s=(1-g_{min}^2)/44 \text{ and } c_s=(45g_{min}^2-1)/44 \tag{11}$$

The variable SNR of Equation (10) is either the SNR per critical frequency band, $SNR_{CB}(i)$, or the SNR per frequency bin, $SNR_{BIN}(k)$, depending on the type of per bin or per band processing.

The SNR per critical frequency band is computed as follows:

$$SNR_{CB}(i) = \frac{0.3E_{CB}^{(1)}(i)+0.7E_{CB}^{(2)}(i)}{N_{CB}(i)}\quad i=0,\ \ldots\ ,17 \tag{12}$$

where $E_{CB}^{(1)}(i)$ and $E_{CB}^{(2)}(i)$ denote the energy per critical frequency band for the past and current frame spectral analyses, respectively (as computed in Equation (4)), and $N_{CB}(i)$ denote the noise energy estimate per critical frequency band.

The SNR per frequency bin in a certain critical frequency band i is computed using the following relation:

$$SNR_{BIN}(k) = \frac{0.3E_{BIN}^{(1)}(k) + 0.7E_{BIN}^{(2)}(k)}{N_{CB}(i)}, \; k = j_i, \ldots, j_i + M_{CB}(i) - 1 \quad (13)$$

where $E_{BIN}^{(1)}(k)$ and $E_{BIN}^{(2)}(k)$ denote the energy per frequency bin for the past[(1)] and the current[(2)] frame spectral analysis, respectively (as computed in Equation (5)), $N_{CB}(i)$ denote the noise energy estimate per critical frequency band, $j_i$ is the index of the first frequency bin in the $i^{th}$ critical frequency band and $M_{CB}(i)$ is the number of frequency bins in critical frequency band i as defined herein above.

According to another, alternative implementation, the scaling gain could be computed in relation to the SNR per critical frequency band or per frequency bin for the first voiced bands. If $K_{VOIC}>0$ then per bin processing can be performed in the first $K_{VOIC}$ bands. Per band processing can then be used for the rest of the bands. In the case where $K_{VOIC}=0$ per band processing can be used over the whole spectrum.

In the case of per band processing for a critical frequency band with index i, after determining the scaling gain using Equation (10) and the SNR as defined in Equation (12) or (13), the actual scaling is performed using a smoothed scaling gain updated in every spectral analysis by means of the following relation:

$$g_{CB,LP}(i)=\alpha_{gs}g_{CB,LP}(i)+(1-\alpha_{gs})g_s \quad (14)$$

According to a feature, the smoothing factor $\alpha_{gs}$ used for smoothing the scaling gain $g_s$ and can be made adaptive and inversely related to the scaling gain $g_s$ itself. For example, the smoothing factor can be given by $\alpha_{gs}=1-g_s$. Therefore, the smoothing is stronger for smaller gains $g_s$. This approach prevents distortion in high SNR segments preceded by low SNR frames, as it is the case for voiced onsets. In the proposed approach, the smoothing procedure is able to quickly adapt and use lower scaling gains upon occurrence of, for example, a voiced onset.

Scaling in a critical frequency band is performed as follows:

$$X'_R(k+j_i)=g_{CB,LP}(i)X_R(k+j_i), \text{ and}$$

$$X'_I(k+j_i)=g_{CB,LP}(i)X_I(k+j_i), \; k=0, \ldots, M_{CB}(i)-1' \quad (15)$$

where $j_i$ is the index of the first frequency bin in the critical frequency band i and $M_{CB}(i)$ is the number of frequency bins in that critical frequency band.

In the case of per bin processing in a critical frequency band with index i, after determining the scaling gain using Equation (10) and the SNR as defined in Equation (12) or (13), the actual scaling is performed using a smoothed scaling gain updated in every spectral analysis as follows:

$$g_{BIN,LP}(k)=\alpha_{gs}g_{BIN,LP}(k)+(1-\alpha_{gs})g_s \quad (16)$$

where the smoothing factor $\alpha_{gs}=1-g_s$ is similar to Equation (14).

Temporal smoothing of the scaling gains prevents audible energy oscillations, while controlling the smoothing using $\alpha_{gs}$ prevents distortion in high SNR speech segments preceded by low SNR frames, as it is the case for voiced onsets for example.

Scaling in a critical frequency band i is then performed as follows:

$$X'_R(k+j_i)=g_{BIN,LP}(k+j_i)X_R(k+j_i), \text{ and}$$

$$X'_I(k+j_i)=g_{BIN,LP}(k+j_i)X_I(k+j_i), \; k=0, \ldots, M_{CB}(i)-1' \quad (17)$$

where $j_i$ is the index of the first frequency bin in the critical frequency band i and $M_{CB}(i)$ is the number of frequency bins in that critical frequency band.

The smoothed scaling gains $g_{BIN,LP}(k)$ and $g_{CB,LP}(i)$ are initially set to 1.0. Each time a non-tonal sound frame is processed (music_flag=0), the value of the smoothed scaling gains are reset to 1.0 to reduce a possible reduction of these smoothed scaling gains in the next frame.

In every spectral analysis performed by the spectral analyser 105, the smoothed scaling gains $g_{CB,LP}(i)$ are updated for all critical frequency bands (even for voiced critical frequency bands processed through per bin processing—in this case $g_{CB,LP}(i)$ is updated with an average of $g_{BIN,LP}(k)$ belonging to the critical frequency band i). Similarly, the smoothed scaling gains $g_{BIN,LP}(k)$ are updated for all frequency bins in the first 17 critical frequency bands, that is up to frequency bin 115 in the case of narrowband coding (the first 21 critical frequency bands, that is up to frequency bin 250 in the case of wideband coding). For critical frequency bands processed with per band processing, the scaling gains are updated by setting them equal to $g_{CB,LP}(i)$ in the first 17 (narrowband coding) or 21 (wideband coding) critical frequency bands.

In the case of a low-energy decoded tonal sound signal, inter-tone noise reduction is not performed. A low-energy sound signal is detected by finding the maximum noise energy in all the critical frequency bands, $\max(N_{CB}(i))$, $i=0, \ldots, 17$, (17 in the case of narrowband coding and 21 in the case of wideband coding) and if this value is lower than or equal to a certain value, for example 15 dB, then no inter-tone noise reduction is performed.

In the case of processing of narrowband signals, the inter-tone noise reduction is performed on the first 17 critical frequency bands (up to 3680 Hz). For the remaining 11 frequency bins between 3680 Hz and 4000 Hz, the spectrum is scaled using the last scaling gain $g_s$ of the frequency bin corresponding to 3680 Hz.

Spectral Gain Correction

The Parseval theorem shows that the energy in the time domain is equal to the energy in the frequency domain. Reduction of the energy of the inter-tone noise results in an overall reduction of energy in the frequency and time domains. An additional feature is that the reducer 108 of quantization noise comprises a per band gain corrector 306 to rescale the energy per critical frequency band in such a manner that the energy in each critical frequency band at the end of the resealing will be close to the energy before the inter-tone noise reduction.

Figure 4:
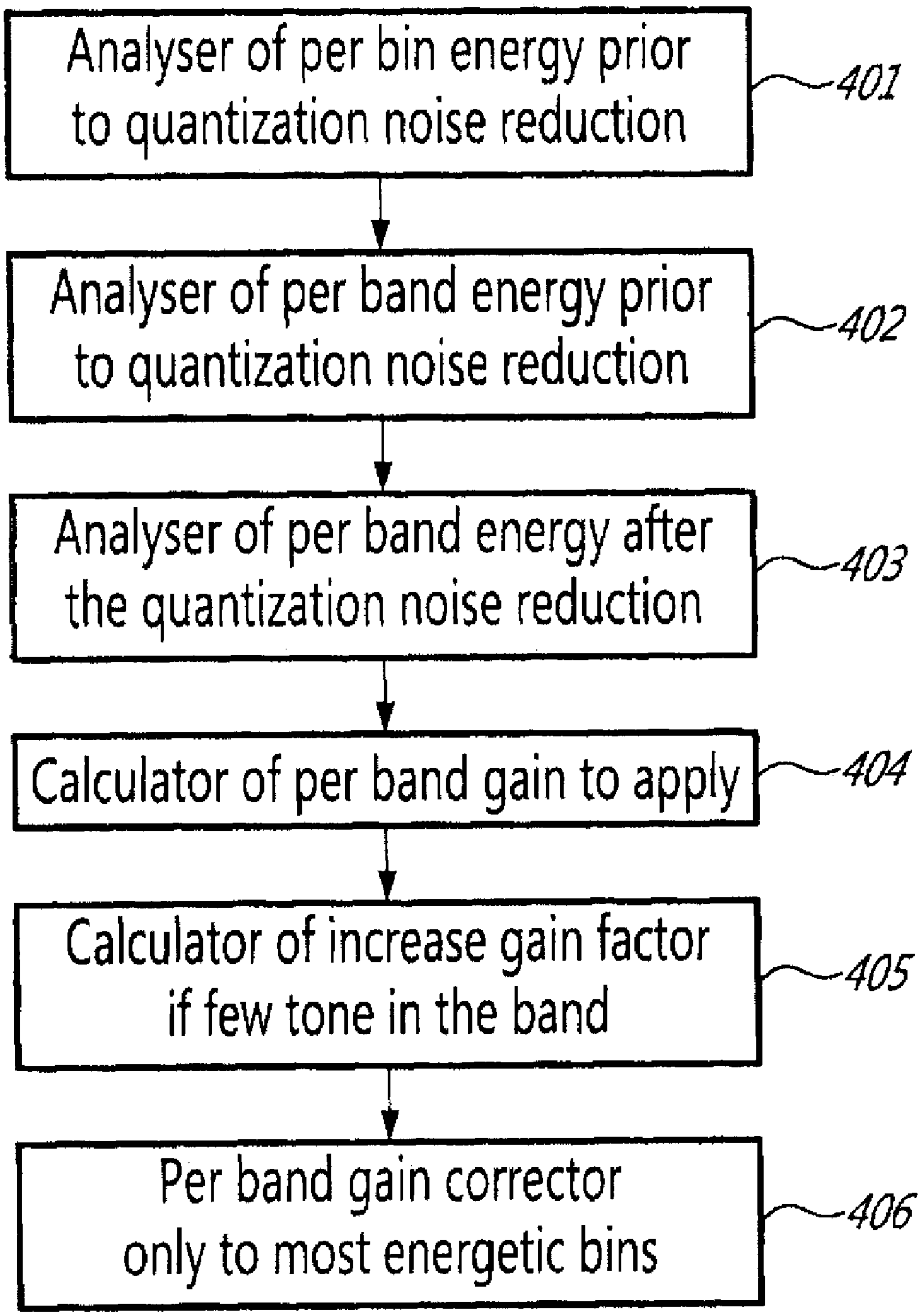
FIG. 4 is a schematic block diagram illustrating tone gain correction.

To achieve such resealing, it is not necessary to rescale all the frequency bins but to rescale only the most energetic bins. The per band gain corrector 306 comprises an analyser 401 (FIG. 4) which identifies the most energetic bins prior to inter-tone noise reduction as the bins scaled by a scaling gain between [0.8, 1.0] in the inter-tone noise reduction phase. According to an alternative, the analyser 401 may also determine the per bin energy prior to inter-tone noise reduction using, for example, Equation (5) in order to identify the most energetic bins.

The energy removed from inter-tone noise will be moved to the most energetic events (corresponding to the most energetic bins) of the critical frequency band. In this manner, the final music sample will sound clearer than just doing a simple inter-tone noise reduction because the dynamic between energetic events and the noise floor will further increase.

The spectral energy of a critical frequency band after the inter-tone noise reduction is computed in the same manner as the spectral energy before the inter-tone noise reduction:

$$E_{CB}(i) = \frac{1}{(L_{FFT}/2)^2 M_{CB}(i)} \sum_{k=0}^{M_{CB}(i)-1} (X_R^2(k+j_i) + X_I^2(k+j_i)), \quad (18)$$

$$i = 0, \ldots 16$$

In this respect, the per band gain corrector 306 comprises an analyser 402 to determine the per band spectral energy prior to inter-tone noise reduction using Equation (18), and an analyser 403 to determine the per band spectral energy after the inter-tone noise reduction using Equation (18).

The per band gain corrector 306 further comprises a calculator 404 to determine a corrective gain as the ratio of the spectral energy of a critical frequency band before inter-tone noise reduction and the spectral energy of this critical frequency band after inter-tone noise reduction has been applied.

$$G_{corr}(i)=\sqrt{(E_{CB}(i)/E_{CB}(i)')}, i=0, \ldots, 16 \quad (19)$$

where $E_{CB}$ is the critical band spectral energy before inter-tone noise reduction and $E_{CB}'$ is the critical frequency band spectral energy after inter-tone noise reduction. The total number of critical frequency bands covers the entire spectrum from 17 bands in Narrowband coding to 21 bands in Wideband coding.

The resealing along the critical frequency band i can be performed as follows:

IF $(g_{BIN,LP}(k+j_i)>0.8$ & $i>4)$ $X''_R(k+j_i)=G_{corr}(k+j_i)X'_R(k+j_i)$, and $X''_I(k+j_i)=G_{corr}(k+j_i)X'_I(k+j_i), k=0, \ldots, M_{CB}(i)-1, \quad (20)$

ELSE $X''_R(k+j_i)=X'_R(k+j_i)$, and $X''_I(k+j_i)=X'_I(k+j_i), k=0, \ldots, M_{CB}(i)-1$ where $j_i$ is the index of the first frequency bin in the critical frequency band i and $M_{CB}(i)$ is the number of frequency bins in that critical frequency band. No gain correction is applied under 600 Hz because it is assumed that spectral energy at very low frequency has been accurately coded by the low bit rate speech-specific codec and any increase of inter-harmonic tone will be audible.

Spectral Gain Boost

It is possible to further increase the clearness of a musical sample by increasing furthermore the gain $G_{corr}$ in critical frequency bands where not many energetic events occur. A calculator 405 of the per band gain corrector 306 determines the ratio of energetic events (ratio of the number of energetic bins on total number of frequency bins) per critical frequency band as follow:

$$REv_{CB} = \frac{NumBin_{max}}{NumBin_{total}} \quad k = 0, \ldots, M_{CB}(i-1)$$

$$NumBin_{max} = \sum (g_{BIN,LP} > 0.8)$$

$$NumBin_{total} = \text{Total bin in a critical band}$$

The calculator 405 then computes an additional correction factor to the corrective gain using the following formula:

IF$(NumBin_{max}>0)$ $C_F=-0.2778 \cdot REv_{CB}+1.2778$

In a per band gain corrector 406, this new correction factor $C_F$ multiplies the corrective gain $G_{corr}$ by a value situated between [1.0, 1.2778]. When this correction factor $C_F$ is taken into consideration, the rescaling along the critical frequency band i becomes:

IF$(g_{BIN,LP}(k+j_i)>0.8$ & $i>4)$ $X''_R(k+j_i)=G_{corr} \cdot C_F \cdot (k+j_i)X'_R(k+j_i)$, and $X''_I(k+j_i)=G_{corr} \cdot C_F \cdot (k+j_i)X'_I(k+j_i), k=0, \ldots, M_{CB}(i)-1$

ELSE $X''_R(k+j_i)=X'_R(k+j_i)$, and $X''_I(k+j_i)=X'_I(k+j_i), k=0, \ldots, M_{CB}(i)-1$ In the particular case of Wideband coding, the rescaling is performed only in the frequency bins previously scaled by a scaling gain between [0.96, 1.0] in the inter-tone noise reduction phase. Usually, higher the bit rate is closer will be the energy of the spectrum to the desired energy level. For that reason the second part of the gain correction, the gain correction factor $C_F$, might not be always used. Finally, at very high bit rate, it could be beneficial to perform gain rescaling only in the frequency bins which were previously not modified (having a scaling gain of 1.0).

Reconstruction of Enhanced, Denoised Sound Signal

After determining the scaled spectral components 308, $X'_R(k)$ of $X_{R''}(k)$ and $X'_I(k)$ or $X_{I''}(k)$, a calculator 307 of the inverse analyser and overlap add operator 110 computes the inverse FFT. The calculated inverse FFT is applied to the scaled spectral components 308 to obtain a windowed enhanced decoded sound signal in the time domain given by the following relation:

$$x_{w,d}(n) = \frac{1}{N} \sum_{k=0}^{N-1} X(k) e^{j2\pi \frac{kn}{N}}, \; n = 0, \ldots, L_{FFT}-1 \quad (21)$$

The signal is then reconstructed in operator 303 using an overlap add operation for the overlapping portions of the analysis. Since a sine window is used on the original decoded tonal sound signal 103 prior to spectral analysis in the spectral analyser 105, the same windowing is applied to the windowed enhanced decoded tonal sound signal 309 at the output of the inverse FFT calculator prior to the overlap add operation. Thus, the doubled windowed enhanced decoded tonal sound signal is given by the relation:

$$x_{ww,d}^{(1)}(n)=w_{FFT}(n)x_{w,d}^{(1)}(n), n=0, \ldots, L_{FFT}-1 \quad (22)$$

For the first third of the Narrowband analysis window, the overlap add operation for constructing the enhanced sound signal is performed using the relation:

$$s(n)=x_{ww,d}^{(0)}(n+2\cdot L_{window}/3)+x_{ww,d}^{(1)}(n),\ n=0,\ldots,L_{window}/3-1 \quad (23)$$

and for the first ninth of the Wideband analysis window, the overlap-add operation for constructing the enhanced decoded tonal sound signal is performed as follows:

$$s(n)=x_{ww,d}^{(0)}(n+2\cdot L_{windowWB}/9)+x_{ww,d}^{(1)}(n),\ n=0,\ldots,L_{windowWB}/9-1$$

where $x_{ww,d}^{(0)}(n)$ is the double windowed enhanced decoded tonal sound signal from the analysis of the previous frame.

Using an overlap add operation, since there is a 80 sample shift (40 in the case of Wideband coding) between the sound signal decoder frame and inter-tone noise reduction frame, the enhanced decoded tonal sound signal can be reconstructed up to 80 samples from the lookahead in addition to the present inter-tone noise reduction frame.

After the overlap add operation to reconstruct the enhanced decoded tonal sound signal, deemphasis is performed in the postprocessor 112 on the enhanced decoded sound signal using the inverse of the above described preemphasis filter. The postprocessor 112 therefore comprises a deemphasis filter which, in this embodiment, is given by the relation:

$$H_{de\text{-}emph}(z)=1/(1-0.68z^{-1}) \quad (24)$$

Inter-Tone Noise Energy Update

Inter-tone noise energy estimates per critical frequency band for inter-tone noise reduction can be calculated for each frame in an inter-tone noise energy estimator (not shown), using for example the following formula:

$$N_{CB}^{0}(i)=\frac{(0.6\cdot E_{CB}^{0}(i)+0.2\cdot E_{CB}^{1}(i)+0.2\cdot N_{CB}^{1}(i))}{16.0},\ i=0,\ldots,16 \quad (25)$$

where $N_{CB}^{0}$ and $E_{CB}^{0}$ represent the current noise and spectral energies for the specified critical frequency band (i) and $N_{CB}^{1}$ and $E_{CB}^{1}$ represent the noise and the spectral energies for the past frame of the same critical frequency band.

This method of calculating inter-tone noise energy estimates per critical frequency band is simple and could introduce some distortions in the enhanced decoded tonal sound signal. However, in low bit rate Narrowband coding, these distortions are largely compensated by the improvement in the clarity of the synthesis sound signals.

In wideband coding, when the inter-tone noise is present but less annoying, the method to update the inter-tone noise energy have to be more sophisticated to prevent the introduction of annoying distortion. Different technique could be use with more or less computational complexity.

Inter-Tone Noise Energy Update Using Weighted Average Per Band Energy:

In accordance with this technique, the second maximum and the minimum energy values of each critical frequency band are used to compute an energy threshold per critical frequency band as follow:

$$\text{thr\_ener}_{CB}(i)=1.85\cdot\left(\frac{\max_2(E_{CB}^{0}(i))+\min(E_{CB}^{0}(i))}{2}\right),\ i=0,\ldots,20$$

where $\max_2$ represents the frequency bin having the second maximum energy value and min the frequency bin having the minimum energy value in the critical frequency band of concern.

The energy threshold ($\text{thr\_ener}_{CB}$) is used to compute a first inter-tone noise level estimation per critical band ($\text{tmp\_ener}_{CB}$) which corresponds to the mean of the energies) ($E_{BIN}$) of all the frequency bins below the preceding energy threshold inside the critical frequency band, using the following relation:

$$mcnt=0$$
$$\text{tmp\_ener}_{CB}(i)=0$$
$$\text{for }(k=0:M_{CB}(i))$$
$$\text{if }(E_{BIN}(k)<\text{thr\_ener}_{CB})$$
$$\text{tmp\_ener}_{CB}(i)=\text{tmp\_ener}_{CB}(i)+E_{BIN}(k)$$
$$mcnt=mcnt+1$$
$$endif$$
$$endfor$$
$$\text{tmp\_ener}_{CB}(i)=\frac{\text{tmp\_ener}_{CB}(i)}{mcnt}$$

where mcnt is the number of frequency bins of which the energies ($E_{BIN}$) are included in the summation and $mcnt \leqq M_{CB}(i)$. Furthermore; the number mcnt of frequency bins of which the energy ($E_{BIN}$) is below the energy threshold is compared to the number of frequency bins ($M_{CB}$) inside a critical frequency band to evaluate the ratio of frequency bins below the energy threshold. This ratio $\text{accepted\_ratio}_{CB}$ is used to weight the first, previously found inter-tone noise level estimation ($\text{tmp\_ener}_{CB}$).

$$\text{accepted\_ratio}_{CB}(i)=\frac{mcnt}{M_{CB}(i)},$$
$$i=0,\ldots,20$$

A weighting factor $\beta_{CB}$ of the inter-tone noise level estimation is different among the bit rate used and the accepted_ratio$_{CB}$. A high accepted_ratio$_{CB}$ for a critical frequency band means that it will be difficult to differentiate the noise energy from the signal energy. In that case it is desirable to not reduce too much the noise level of that critical frequency band to not risk any alteration of the signal energy. But a low accepted_ratio$_{CB}$ indicates a large difference between the noise and signal energy levels then the estimated noise level could be higher in that critical frequency band without adding distortion. The factor $\beta_{CB}$ is modified as follow:

$$\text{IF }((\text{accepted\_ratio}(i)<0.6\ |\ \text{accepted\_ratio}(i-1)<0.5)\ \&\ i>9)$$
$$\beta_{CB}(i)=1$$
$$\text{ELSE IF}(\text{accepted\_ratio}(i)<0.75\ \ \&\ i>15)$$
$$\beta_{CB}(i)=2$$

-continued $$\text{ELSE IF}\left(\begin{pmatrix} \text{accepted\_ratio}(i) > 0.85 \ \& \\ \text{accepted\_ratio}(i-1) > 0.85 \ \& \\ \text{accepted\_ratio}(i-2) > 0.85 \end{pmatrix} \ \& \ \text{bitrate} > 16000\right),$$

$$i = 0, \ldots, 20$$

$$\beta_{CB}(i) = 30$$

$$\text{ELSE IF}(\text{bitrate} > 16000)$$

$$\beta_{CB}(i) = 20$$

$$\text{ELSE}$$

$$\beta_{CB}(i) = 16$$

Finally the inter-tone noise estimation per critical frequency band can be smoothed differently if the inter-tone noise is increasing or decreasing.

$$\text{Noise decreasing: } N_{CB}^0(i) = (1-\alpha)\left(\frac{\text{tmp\_ener}_{CB}(i)}{\beta_{CB}(i)}\right) + \alpha \cdot N^1(i)$$

$$\text{Noise increasing: } N_{CB}^0(i) = (1-\alpha_2)\left(\frac{\text{tmp\_ener}_{CB}(i)}{\beta_{CB}(i)}\right) + \alpha_2 \cdot N^1(i)$$

$$i = 0, \ldots, 20$$

Where $$\alpha = 0.1$$

$$\alpha_2 = \begin{cases} 0.98 & \text{for bitrate} > 16000 \text{ bps} \\ 0.95 & \text{otherwise} \end{cases}$$

where $N_{CB}^0$ represents the current noise energy for the specified critical frequency band (i) and $N_{CB}^1$ represents the noise energy of the past frame of the same critical frequency band.

Although the present invention has been described in the foregoing description by way of non restrictive illustrative embodiments thereof, many other modifications and variations are possible within the scope of the appended claims without departing from the spirit, nature and scope of the present invention.

REFERENCES

[1] 3GPP TS 26.190, "Adaptive Multi-Rate-Wideband (AMR-WB) speech codec; Transcoding functions".

[2] J. D. Johnston, "Transform coding of audio signal using perceptual noise criteria," *IEEE J. Select. Areas Commun.*, vol. 6, pp. 314-323, February 1988.

What is claimed is:

1. A system for enhancing a tonal sound signal decoded by a decoder of a speech-specific codec in response to a received coded bit stream, comprising:

a spectral analyser responsive to the decoded tonal sound signal to produce spectral parameters representative of the decoded tonal sound signal, wherein the spectral parameters comprise a spectral energy of the decoded tonal sound signal calculated by the spectral analyser;

a classifier of the decoded tonal sound signal into a plurality of different sound signal categories, wherein the signal classifier comprises a finder of a deviation of a variation of the calculated signal spectral energy over a number of previous frames of the decoded tonal sound signal; and a reducer of a quantization noise in low-energy spectral regions of the decoded tonal sound signal in response to the spectral parameters from the spectral analyzer and the classification of the decoded tonal sound signal into the plurality of different sound signal categories.

2. A system for enhancing a decoded tonal sound signal according to claim 1, wherein:

the system comprises a preprocessor of the decoded tonal sound signal which emphasizes higher frequencies of the decoded tonal sound signal prior to supplying the decoded tonal sound signal to the spectral analyser;

the spectral analyser performs a Fast Fourier Transform on the decoded tonal sound signal to produce the spectral parameters representative of the decoded tonal sound signal;

the system comprises a calculator of an inverse Fast Fourier Transform of enhanced spectral parameters from the reducer of quantization noise to obtain an enhanced decoded tonal sound signal in time domain; and the system comprises a postprocessor of the enhanced decoded tonal sound signal to de-emphasize higher frequencies of the enhanced decoded tonal sound signal.

3. A system for enhancing a decoded tonal sound signal according to claim 1, wherein the signal classifier comprises comparators for comparing the deviation of the variation of the calculated signal spectral energy to a plurality of thresholds respectively corresponding to the sound signal categories.

4. A system for enhancing a decoded tonal sound signal according to claim 3, wherein the sound signal categories comprise a non-tonal sound signal category, and wherein the signal classifier comprises a controller of the reducer of quantization noise instructing said reducer not to reduce the quantization noise when comparisons by the comparators indicate that the decoded sound signal is a non-tonal sound signal.

5. A system for enhancing a decoded tonal sound signal according to claim 3, wherein the sound signal categories comprise tonal sound signal categories and wherein, when comparisons by the comparators indicate that the decoded tonal sound signal is comprised within one of the tonal sound signal categories, the signal classifier comprises a controller of the reducer of quantization noise instructing said reducer to reduce the quantization noise by a given amplitude and within a given frequency range both associated with said one tonal sound signal category.

6. A system for enhancing a decoded tonal sound signal according to claim 3, wherein the thresholds comprise floating thresholds increased or decreased in response to a counter of a series of frames of at least a given one of said sound signal categories.

7. A system for enhancing a decoded tonal sound signal according to claim 1, wherein:

the spectral analyser divides a spectrum resulting from spectral analysis by the spectral analyser into a set of critical frequency bands; and the reducer of quantization noise comprises a per band gain corrector that rescales a spectral energy per critical frequency band in such a manner that the spectral energy in each critical frequency band at the end of the resealing is close to a spectral energy in the critical frequency band before reduction of the quantization noise.

8. A system for enhancing a decoded tonal sound signal according to claim 7, wherein the critical frequency bands comprises respective numbers of frequency bins, and wherein the per band gain corrector rescales most energetic ones of the frequency bins.

9. A system for enhancing a decoded tonal sound signal according to claim 7, wherein the per band gain corrector comprise a calculator of a corrective gain as a ratio between the spectral energy in the critical frequency band before reduction of quantization noise and a spectral energy in the critical frequency band after reduction of quantization noise.

10. A system for enhancing a decoded tonal sound signal according to claim 9, wherein the per band gain corrector comprises a calculator of a correction factor as a function of a ratio of energetic events in the critical frequency band, wherein the per band gain corrector multiplies the corrective gain by the correction factor.

11. A method for enhancing a tonal sound signal decoded by a decoder of a speech-specific codec in response to a received coded bit stream, comprising:

spectrally analysing the decoded tonal sound signal to produce spectral parameters representative of the decoded tonal sound signal, wherein the spectral parameters comprise a spectral energy of the decoded tonal sound signal calculated by the spectral analyser;

classifying the decoded tonal sound signal into a plurality of different sound signal categories, wherein classifying the decoded tonal sound signal comprises finding a deviation of a variation of the signal spectral energy over a number of previous frames of the decoded tonal sound signal; and reducing a quantization noise in low-energy spectral regions of the decoded tonal sound signal in response to the spectral parameters from the spectral analysis and the classification of the decoded tonal sound signal into the plurality of different sound signal categories.

12. A method for enhancing a decoded tonal sound signal according to claim 11, wherein:

the method comprises emphasizing higher frequencies of the decoded tonal sound signal prior to spectrally analysing the decoded tonal sound signal;

spectrally analysing the decoded tonal sound signal comprises performing a Fast Fourier Transform on the decoded tonal sound signal to produce the spectral parameters representative of the decoded tonal sound signal;

the method comprises calculating an inverse Fast Fourier Transform of enhanced spectral parameters from the reducing of the quantization noise to obtain an enhanced decoded tonal sound signal in time domain; and the method comprises de-emphasizing higher frequencies of the enhanced decoded tonal sound signal.

13. A method for enhancing a decoded tonal sound signal according to claim 11, wherein classifying the decoded tonal sound signal comprises comparing the deviation of the variation of the signal spectral energy to a plurality of thresholds respectively corresponding to the sound signal categories.

14. A method for enhancing a decoded tonal sound signal according to claim 13, wherein the sound signal categories comprise a non-tonal sound signal category, and wherein classifying the decoded tonal sound signal comprises controlling reducing of the quantization noise for not reducing the quantization noise when the comparing of the deviation of the variation of the signal spectral energy to the plurality of thresholds indicates that the decoded tonal sound signal is a non-tonal sound signal.

15. A method for enhancing a decoded tonal sound signal according to claim 13, wherein the sound signal categories comprise tonal sound signal categories and wherein, when the comparing of the deviation of the variation of the signal spectral energy to the plurality of thresholds indicates that the decoded tonal sound signal is comprised within one of the tonal sound signal categories, the classifying the decoded tonal sound signal comprises controlling the reducing of the quantization noise to reduce the quantization noise by a given amplitude and within a given frequency range both associated with said one tonal sound signal category.

16. A method for enhancing a decoded tonal sound signal according to claim 13, wherein the thresholds comprise floating thresholds, and wherein the method comprises increasing and decreasing the floating thresholds in response to a counter of a series of frames of at least a given one of the sound signal categories.

17. A method for enhancing a decoded tonal sound signal according to claim 11, wherein:

spectrally analysing the decoded tonal sound signal comprises dividing a spectrum resulting from the spectral analysis into a set of critical frequency bands; and the reducing of the quantization noise comprises resealing a spectral energy per critical frequency band in such a manner that the spectral energy in each critical frequency band at an end of the resealing is close to a spectral energy in the critical frequency band before reduction of the quantization noise.

18. A method for enhancing a decoded tonal sound signal according to claim 17, wherein the critical frequency bands comprise respective numbers of frequency bins, and wherein the resealing of the spectral energy per critical frequency band comprises resealing most energetic ones of the frequency bins.

19. A method for reducing a level of quantization noise according to claim 17, wherein the resealing of the spectral energy per critical frequency band comprises calculating a corrective gain as a ratio between the spectral energy in the critical frequency band before reduction of quantization noise and a spectral energy in the critical frequency band after reduction of quantization noise.

20. A method for enhancing a decoded tonal sound signal according to claim 19, wherein the resealing of the spectral energy per critical frequency band comprises calculating a correction factor as a function of a ratio of energetic events in the critical frequency band, and multiplying the corrective gain by the correction factor.

* * * * *